(No Model.)
S. P. SAWYER.
OATMEAL MACHINE.
No. 249,798. Patented Nov. 22, 1881.
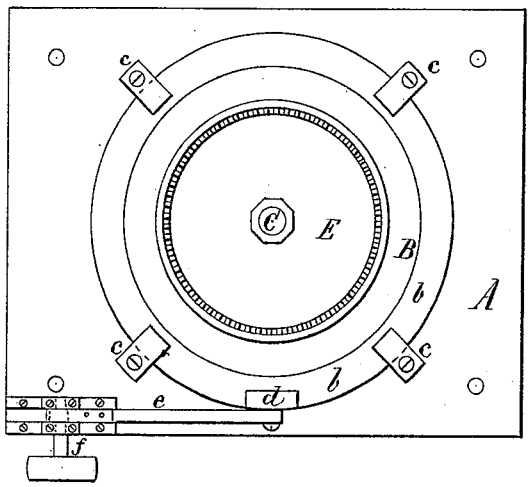
Fig 1.
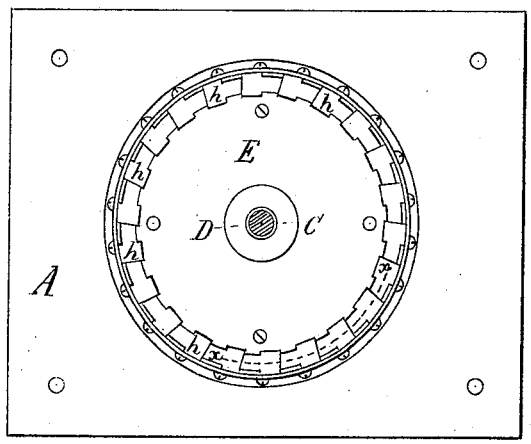
Fig 2.
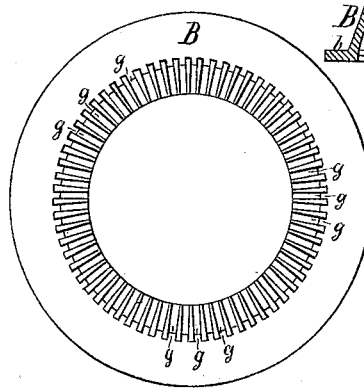
Fig 3.
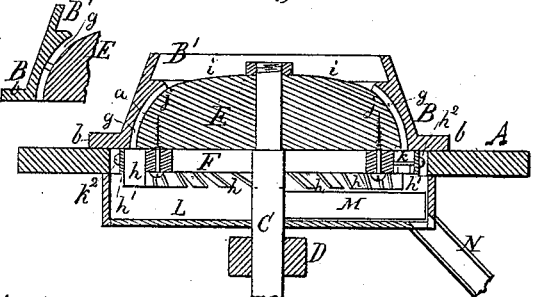
Fig 4.
Fig 14. Fig 15.
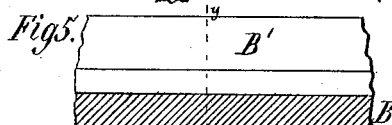
Fig 16. Fig 5.
Fig 8.
Fig 9.
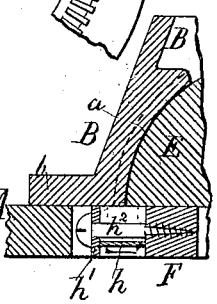
Fig 6.
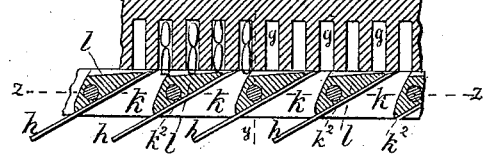
Fig 7.
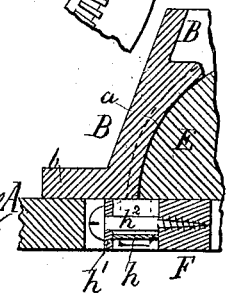
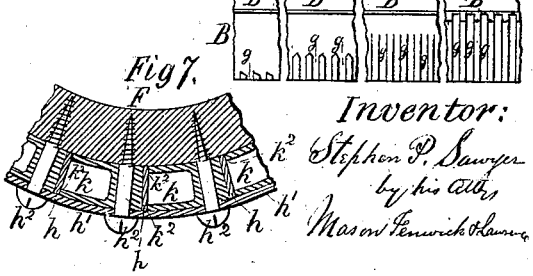
Fig 10. Fig 11. Fig 12. Fig 13.
Witnesses:
Robt L. Fenwick.
B. Carlyle Fenwick.
Inventor:
Stephen P. Sawyer
by his Attys
Mason Fenwick & Lawrence

UNITED STATES PATENT OFFICE.

STEPHEN P. SAWYER, OF MUSCATINE, IOWA.

OATMEAL-MACHINE.

SPECIFICATION forming part of Letters Patent No. 249,798, dated November 22, 1881.

Application filed July 30, 1881. (No model.)

*To all whom it may concern:*

Be it known that I, STEPHEN P. SAWYER, a citizen of the United States, residing at Muscatine, in the county of Muscatine and State of Iowa, have invented a new and useful Improvement in Oatmeal-Machines, of which the following is a specification.

The nature of my invention consists in the combination of a plain-surfaced revolving disk, revolving cutters, and a casing provided with separated passages.

It also consists in a casing provided with separated passages and means whereby it is vibrated or reciprocated, in combination with a plain-surfaced disk, a gage or rest, and revolving cutters, whereby the machine is prevented from becoming clogged.

It also consists in cutters passed obliquely through a ring, in combination with a plain-surfaced disk, and with a casing having separated passages, which are directly over said cutters, the said combination being such that the cut product descends through the throats of the cutters into a suitable receiver, and is discharged in any proper manner.

In the accompanying drawings, Figure 1 is a top view of the machine with the supply or conducting hopper removed. Fig. 2 is a bottom view of the revolving plain-surfaced disk, the revolving knives, and the casing with separated passages, the receiving box or chamber being removed. Fig. 3 is an inverted view of the casing with separated passages. Fig. 4 is a vertical central section of the upper or main portion of the machine. Fig. 5 is an enlarged section on the line $x\,x$ of Fig. 2, the parts being drawn flatwise instead of on a circle. Fig. 6 is a vertical section on the line $y\,y$ of Fig. 5. Fig. 7 is a horizontal section on the line $z\,z$ of Fig. 5. Figs. 8 and 9 show modifications in the construction of the oat-passages of the casing. Figs. 10, 11, 12, and 13 are elevations showing several various constructions of oat-passages which may be adopted in constructing my machine; and Figs. 14, 15, and 16 are diagrams showing modified forms of the revolving disk and channeled casing.

A represents a bed or part of a frame, of any suitable construction, to which the casing B is fitted in either a stationary or movable manner. The casing B may be in the form of a truncated cone, and its inner surface may be on straight lines or concave, as shown at $a$. The base of this case may have a horizontal flange, $b$, which flange may extend under angular pieces $c$, bolted or screwed to the bed A. From one portion of this flange a lug, $d$, extends upward, and to this lug a pitman-rod, $e$, is connected, said rod leading from an eccentric or crank of a pulley-shaft, $f$, as shown. The pulley-shaft and eccentric, together with the pitman, impart a vibratory motion to the casing upon the bed A. Any other gyratory or analogous shaking motion may be given to the casing. The object of this motion is to clear the operating portions of the machine, and thereby prevent the knives and passages from becoming clogged with oats or cut product thereof while the machine is in operation. The aforesaid interior surface of the concave is provided with channels or passages $g$, separated from one another laterally at the points where the oats are acted upon by the cutters $h$. These channels may be formed by simple teeth, as in Fig. 10 of the drawings; or they may be extended in length by employing teeth, such as in Fig. 11, or vanishing ribs, as in Fig. 12, or continuous complete ribs, as in Fig. 13. In Figs. 3 and 4 the plan shown in Fig. 13 is adopted to illustrate my invention.

C is a vertical revolving shaft provided with a pulley, D, and also having a revolving disk, E, fastened upon its upper end. This disk is of convex form on its upper surface, $i$, and periphery $j$, and its periphery just fits and matches the faces of the ribs forming the channels of the concave surface of the casing B, as shown. Above this disk a hopper-like extension, B′, is formed on the casing, and the opening in this extension is nearly equal in diameter to the diameter of the disk. The under surface of the disk is flat, and upon this surface a perforated ring, F, is fastened. The perforations $k$ in this ring unite with slots $k^2$ in the periphery of the ring F, and they are inclined and flaring in a downward direction, and they stand outside the disk E to a certain extent, and thereby come directly under the channels or passages $g$ of the casing, as shown in Figs. 4 and 6. The cutters are passed through the slots $k^2$ into the oblique perforations $k$, and they are set in an oblique position, and clamped in place by means of the circular clamp $h'$ and set-screws $h^2$, as shown in Fig. 7, or in any other more suitable way. The sharp edges of the cutters very nearly touch the lower channeled portion of the casing, and the portion of the ring F which extends under the said channeled portion of the casing has slight inclinations $l$, and serves as a gage or rest for oats which pass down through the channels, and are cut into fine particles gradually by the knives. The oats to be cut are supplied into the extension B' of the casing from a suitable hopper, (not shown,) and they rest in bulk upon the disk E, which, by having a plain surface and revolving freely, causes them to pass rapidly toward the concave portion of the casing B, and then singly down through the channels of said casing. The oats, when they arrive at the bottom of the channels, rest upon the inclined portions $l$ of the knife-ring F, and the knives, during their revolution, cut off portions of the respective oats until the whole is reduced to oatmeal. The oatmeal as fast as made is discharged through the throats or perforations $k$ into a box or chamber, L, from which it is swept by a revolving blade, M, attached to the shaft C, the oatmeal discharging into a suitable receiver by means of a spout, N, leading from said chamber.

It will be observed that the oats are fed to the channels by centrifugal force over a plain surface, and then by their own gravity they fall singly through the channels upon the gage-ring, ready to be cut by the horizontally-revolving knives.

In constructing machines in accordance with my invention it is not very material that the channels be formed on a concave or an inclined surface, as a straight or nearly straight surface might answer; nor is it very essential that the top of the disk be very convex or curved to a great extent, as a flat disk under rapid motion will cause the oats to pass to the vertical, inclined, curved, or other analogous separated channels or passages. The plain-surfaced disk feeds the oats without grinding them into oatmeal, as in machines having grooved feeding-disks.

What I claim as my invention, and desire to secure by Letters Patent, is—

1. The combination of a plain-surfaced disk upon a revolving shaft, revolving cutters upon a gage ring or rest for descending oats, and a circular casing provided with separated passages, substantially as and for the purpose described.

2. The casing provided with separated passages and means whereby it is vibrated or shaken, in combination with a plain-surfaced disk and revolving cutters on a ring, and a gage or rest, substantially as and for the purpose described.

3. The ring F, provided with oblique discharge-perforations for cutters which are clamped or otherwise suitably secured in position, in combination with a plain-surfaced disk, and with a casing having separated passages which are directly over said cutters, substantially as and for the purpose described.

STEPHEN PAYSON SAWYER.

Witnesses:
CHAS. F. GARLOCK,
J. B. BETTS.